United States Patent
Shusterman

(10) Patent No.: US 9,432,310 B1
(45) Date of Patent: Aug. 30, 2016

(54) CIRCUIT SWITCHED FALLBACK FAILURE HANDLING IN WIRELESS COMMUNICATION NETWORKS

(71) Applicant: Sprint Communications Company L.P., Overland Park, KS (US)

(72) Inventor: Alex Shusterman, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 162 days.

(21) Appl. No.: 14/203,901

(22) Filed: Mar. 11, 2014

(51) Int. Cl.
*H04L 12/939* (2013.01)
*H04L 12/26* (2006.01)
*H04L 12/707* (2013.01)
*H04L 12/703* (2013.01)
*H04W 36/00* (2009.01)

(52) U.S. Cl.
CPC ......... *H04L 49/552* (2013.01); *H04L 43/0811* (2013.01); *H04L 45/22* (2013.01); *H04L 45/28* (2013.01); *H04W 36/0022* (2013.01)

(58) Field of Classification Search
None
See application file for complete search history.

(56) References Cited

U.S. PATENT DOCUMENTS

| 8,224,325 B2 | 7/2012 | Zhang et al. | |
| 2010/0041398 A1* | 2/2010 | Sand | H04W 8/20 455/433 |
| 2012/0028661 A1 | 2/2012 | Fang et al. | |
| 2012/0034910 A1 | 2/2012 | Fang et al. | |
| 2012/0170503 A1* | 7/2012 | Kelley | H04W 48/06 370/312 |
| 2012/0302234 A1* | 11/2012 | Wallis | H04W 36/0022 455/433 |
| 2013/0265884 A1* | 10/2013 | Brombal | H04W 76/041 370/242 |
| 2013/0329567 A1* | 12/2013 | Mathias | H04W 36/30 370/242 |

* cited by examiner

Primary Examiner — Edan Orgad
Assistant Examiner — Saumit Shah

(57) ABSTRACT

Systems, methods, and software for handling circuit switch fallback (CSFB) communications are provided herein. A method of operating a wireless communication system is provided, where a wireless communication device is initially configured to use CSFB services over a first wireless communication network. The method includes detecting CSFB failure by at least monitoring performance of a CSBF link between the first wireless communication network and a second wireless communication network that routes voice call signaling over the CSBF link for at least the wireless communication device, and responsive to the CSFB failure, informing at least the wireless communication device of the CSFB failure and routing further voice call signaling for the wireless communication device using the second wireless communication network instead of the CSFB link.

18 Claims, 5 Drawing Sheets

CIRCUIT SWITCHED FALLBACK FAILURE HANDLING IN WIRELESS COMMUNICATION NETWORKS

TECHNICAL FIELD

Aspects of the disclosure are related to the field of wireless communications, and in particular, circuit switch fallback handling for wireless communication devices in wireless communication networks.

TECHNICAL BACKGROUND

Wireless communication systems typically include wireless access systems with equipment such as wireless access nodes along with various control and routing nodes which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some wireless communication systems, more than one wireless communication protocol or wireless frequency spectrum can be employed across more than one wireless network. For example, a first wireless network employing a first wireless communication protocol can be deployed along with a second wireless network employing a second wireless communication protocol. Separate wireless access equipment can be deployed for each wireless network, such as when a fourth generation (4G) Long Term Evolution (LTE) wireless network is deployed over a similar geographic area as a third generation (3G), legacy, or other non-LTE wireless network. Wireless communication devices can be configured to support multiple wireless access modes, such as communicating with one or more wireless networks.

Voice services or overhead signaling for the voice services of legacy wireless networks can be provided over other non-legacy wireless communication networks. In some examples, circuit switched fallback (CSFB) techniques are employed to carry overhead signaling for voice communications of a legacy wireless communication network over the overhead signaling or data services of another wireless communication network.

OVERVIEW

Systems, methods, and software for handling circuit switch fallback (CSFB) communications are provided herein. A method of operating a wireless communication system is provided, where a wireless communication device is initially configured to use CSFB services over a first wireless communication network. The method includes detecting CSFB failure by at least monitoring performance of a CSBF link between the first wireless communication network and a second wireless communication network that routes voice call signaling over the CSBF link for at least the wireless communication device, and responsive to the CSFB failure, informing at least the wireless communication device of the CSFB failure and routing further voice call signaling for the wireless communication device using the second wireless communication network instead of the CSFB link.

In another example, a wireless communication system is provided, where a wireless communication device is initially configured to use CSFB services over a first wireless communication network. The wireless communication system includes a control node configured to detect CSFB failure by at least monitoring performance of a CSBF link between the first wireless communication network and a second wireless communication network that routes voice call signaling over the CSBF link for at least the wireless communication device. Responsive to the CSFB failure, the control node is configured to inform at least the wireless communication device of the CSFB failure. Responsive to the CSFB failure, the wireless communication network is configured to route further voice call signaling for the wireless communication device using the second wireless communication network instead of the CSFB link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
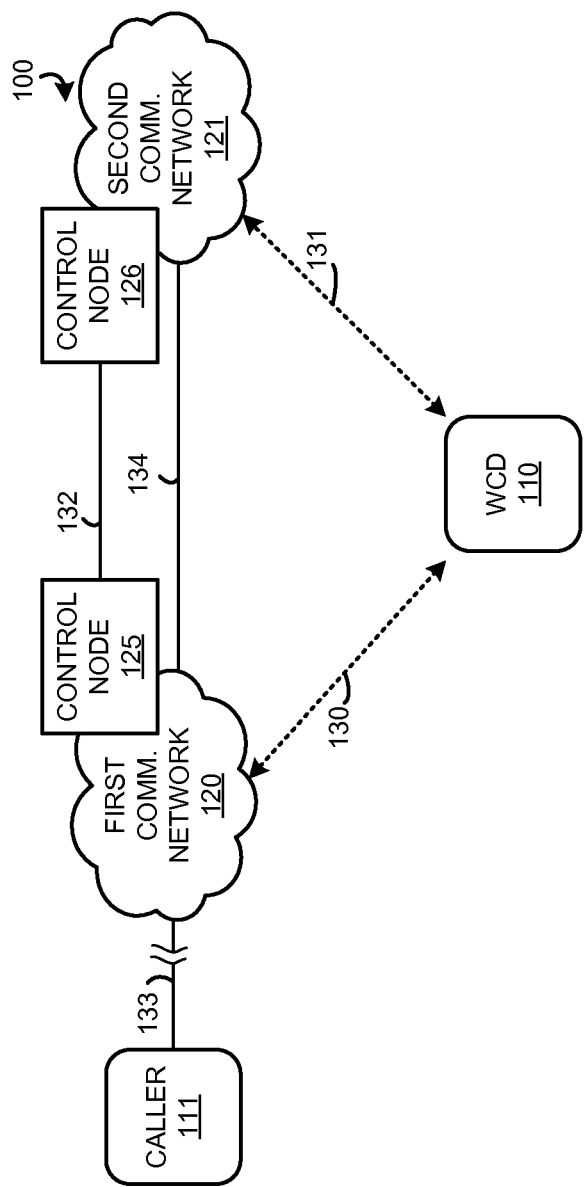
FIG. 1 is a system diagram illustrating a communication system.

FIG. 1 is a system diagram illustrating communication system 100. Communication system 100 includes wireless communication device (WCD) 110, caller 111, first wireless communication network 120, second wireless communication network 121, control node 125, and control node 126. First wireless communication network 120 includes control node 125. Second wireless communication network 121 includes control node 126. Control node 125 and control node 126 communicate over link 132. WCD 110 can communicate with first wireless communication network 120 over wireless link 130, and can communicate with second wireless communication network 121 over wireless link 131. First wireless communication network 120 and second wireless communication network 121 communicate over link 134. WCD 110 can receive wireless access to communication services over any of links 130-131. The communication services can include voice calls, data exchange, web pages, streaming media, or text messages, among other communication services.

Figure 2:
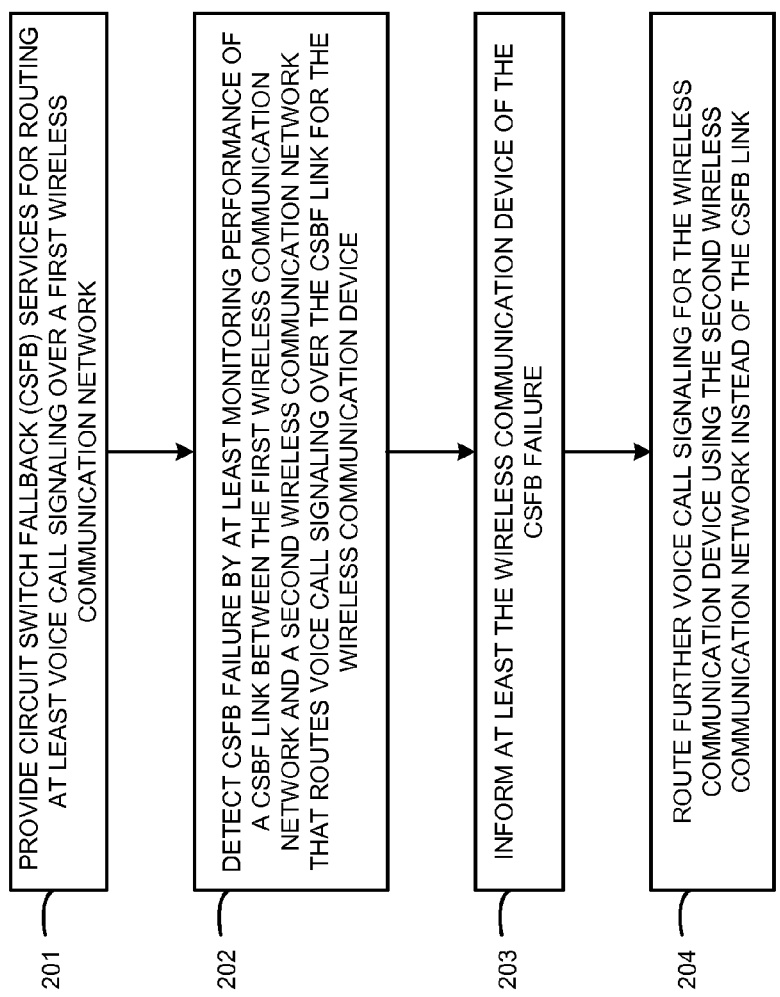
FIG. 2 is a flow diagram illustrating a method of operation of a control node.

FIG. 2 illustrates a flow diagram which describes an example method of operation of a control node, such as control node 125 or control node 126 of FIG. 1. The operations of FIG. 2 are referenced parenthetically in the description below.

In FIG. 2, first wireless communication network 120 provides (201) circuit switch fallback (CSFB) services for routing at least voice call signaling over first wireless communication network 120 for WCD 110. In this example, CSFB services can be provided by first wireless communication network 120 over wireless link 130. CSFB services include the transport of at least voice call signaling for voice call services of a legacy wireless communication network over wireless communications of another wireless communication network. The voice call signaling can also include overhead or control signaling associated with voice calls, such as paging signaling, circuit switched voice call signaling, and text message signaling. Other types of overhead or control signaling can be carried over CSFB signaling pathways of wireless link 130. In FIG. 1, first wireless communication network 120 provides CSFB services for transport of the voice call signaling of second wireless communication network 121 for at least WCD 110.

To receive the CSFB services over first wireless communication network 120, WCD 110 wirelessly registers with first wireless communication network 120 to receive wireless access to communication services, and can indicate that WCD 110 desires to receive CSFB services over first wireless communication network 120. The communication services can include signaling for a cellular voice service or cellular data service, such as provided over wireless link 130, and can include various registration and handshaking to establish wireless link 130.

Although voice call signaling for incoming voice calls is routed using CSFB services, the actual voice calls associated with the voice call signaling can be routed over a selected one of first wireless communication network 120 and second wireless communication network 121. In examples where the voice calls are routed over first wireless communication network 120, wireless circuit-switched pathways can be employed, such as found in a CDMA or GSM network. In examples where the voice calls are routed over second wireless communication network 121, a voice over packet system can be employed for the voice calls. The voice over packet systems can include exchanging voice communications associated with the voice call over a wireless data service of second wireless communication network 121 using a voice over packet (VoP) user application on WCD 110, such as Skype, Fring, or another user application. The VoP application can include a voice over Internet protocol (VoIP) or voice over LTE (VoLTE) application or software service of WCD 110.

Control node 125 or control node 126 detects (202) CSFB failure by at least monitoring performance of a CSFB link between first wireless communication network 120 and second wireless communication network 121 that routes voice call signaling over the CSFB link for at least WCD 110. The CSFB link in this example comprises link 132 between first wireless communication network 120 and second wireless communication network 121. CSFB failure can be detected by control node 125 or control node 126 during operation of link 132. This failure can include portions of equipment or connections of link 132 that cease to provide CSFB signaling or voice call services for one or more wireless communication devices that receive CSFB services through first wireless communication network 120.

Control node 125 or control node 126 can monitor traffic over link 132, such as voice call signaling and overhead signaling associated with voice call traffic, or other traffic to determine when link 132 has failed or entered a degraded mode of operation. This voice call signaling can comprise a heartbeat signal monitored by control node 125 or control node 126. In some examples, control node 125 or control node 126 establishes special heartbeat traffic as the heartbeat signal to be periodically sent over link 132 to test performance of link 132 and determine if CSFB services are active on link 132.

When link 132 indicates failure of CSFB services, then control node 125 or control node 126 informs (203) at least WCD 110 of CSFB failure. In this example, WCD 110 is shown as receiving CSFB services from first wireless communication network 120. If link 132 no longer can provide CSFB services, such as due to a failure of link 132, then WCD might still be expecting to receive voice call signaling and initiate voice calls over the CSFB services of first wireless communication network 120. Control node 125 or control node 126 can transfer a CSFB failure message to WCD 110, which can comprise one or more packets that indicate an inactive status or failure state of the CSFB services for WCD 110. The CSFB failure message can be transferred over link 132 for delivery to WCD 110. WCD 110 can responsively exit a CSFB mode and initiate any voice calls over a different voice call pathway than the CSFB services of first communication network 120.

For example, after disabling a CSFB configuration responsive to the CSFB failure message, WCD 110 can register with second wireless communication network 121 to receive voice call signaling. The registration process can include a registration process over wireless link 131 or a registration process to establish wireless link 131. Beacon or pilot signals of second wireless communication network 121 can be monitored by WCD 110 to establish a voice call service over wireless link 131. The voice call service can include a cellular voice service, such as provided over wireless link 131, and can include various registration and handshaking to establish wireless link 131. The CSFB configuration can be indicated as disabled to control node 125 by WCD 110 during this registration process with second wireless communication network 121, unless already indicated during a de-registration process with first wireless communication network 120.

Control node 125 or control node 126 routes (204) further incoming voice calls for WCD 110 using second wireless communication network 121 instead of the CSFB link. Overhead signaling, such as voice call paging, are also routed over second wireless communication network 121 instead of over first wireless communication network 120. Incoming call signaling for WCD 110, such as for voice calls initiated by caller 111 to reach WCD 110, are routed over second wireless communication network 121 and wireless link 131 instead of over link 132, first wireless communication network 120, and wireless link 130. By routing signaling for incoming voice calls over second wireless communication network 121 and wireless link 131, WCD 110 can be reached without using the CSFB services and link 132. It should be understood that control node 125 or control node 126 might not actually route traffic or signaling for voice calls, and instead just issue commands or control instructions to equipment that routes voice call traffic or signaling information.

Figure 3:
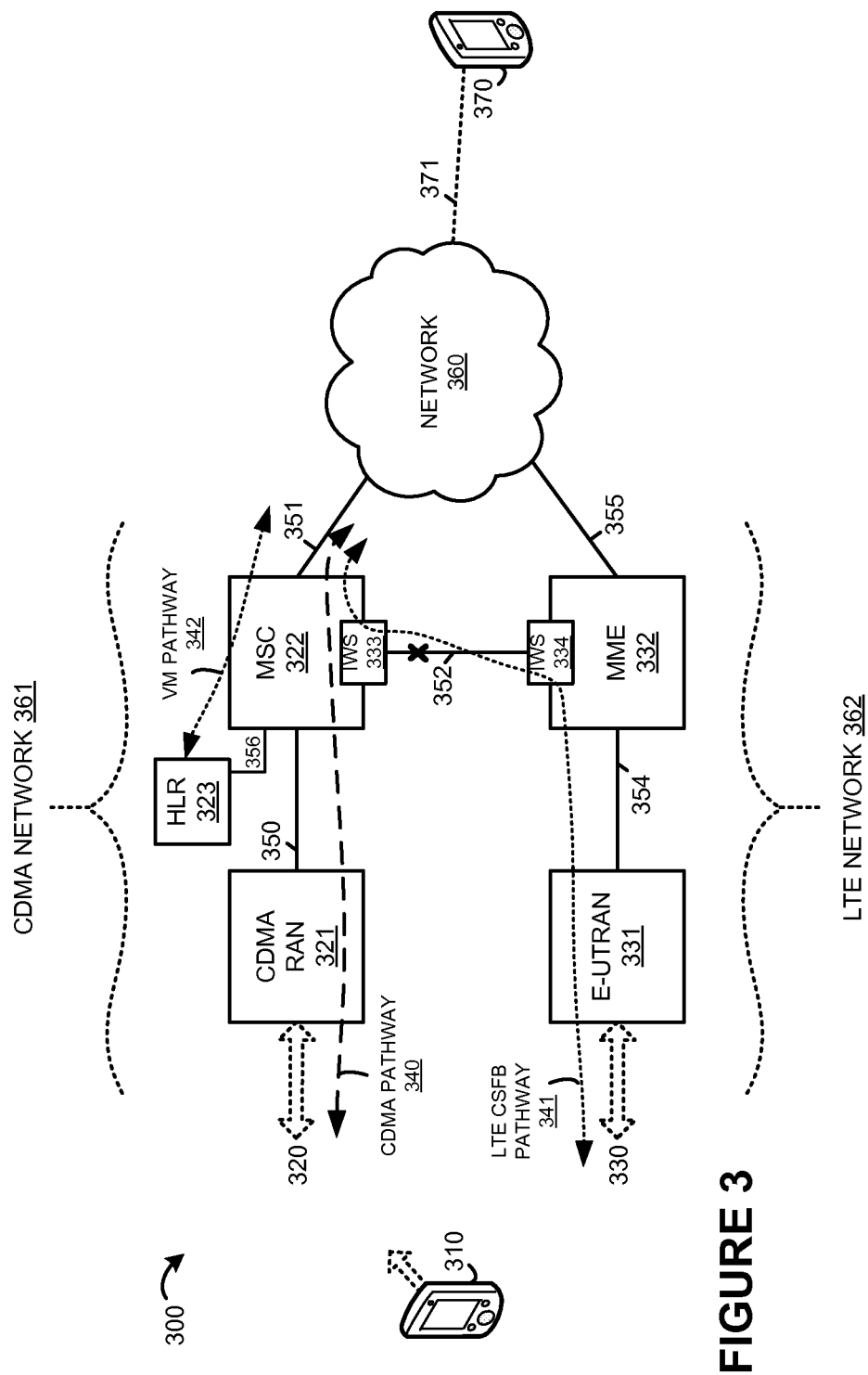
FIG. 3 is a system diagram illustrating a communication system.

FIG. 3 is a system diagram illustrating communication system 300. Communication system 300 includes user devices 310 and 370, Code Division Multiple Access (CDMA) radio access network (RAN) 321, mobile switching center (MSC) 322, home location register (HLR) 323, Evolved Universal Terrestrial Radio Access network (E-UTRAN) 331, Mobility Management Entity (MME) 332, interworking service (IWS) node 333 IWS node 334, and network 360.

User device 310 comprises a wireless communication end user device, such as a smartphone, and can communicate with any of CDMA RAN 321 and E-UTRAN 331 over the associated wireless links. User device 370 comprises an end user device, which can include devices as discussed for user device 310, or can include other wireless or wired communication devices. User device 370 communicates with at least network 360 over link 371. CDMA RAN 321 and MSC 322 communicate over backhaul link 350, which is a T1 link in this example. MSC 322 and HRL 323 communicate over link 356 which is a packet link in this example. MSC 322 and core network 360 communicate over link 351, which is an optical network link in this example. E-UTRAN 331 and MME 332 communicate over backhaul link 354, which is an Ethernet link in this example. MME 332 and core network 360 communicate over link 355, which is an optical network link in this example. IWS 333 and MSC 322 are communicatively coupled, and in some examples, MSC 322 includes IWS 333. IWS 334 and MME 332 are communicatively coupled and in some examples, MME 332 includes IWS 334. IWS 333 and IWS 334 communicate over link 352, which is an S102 link in this example.

Elements 321, 322, 323, 331, 332, 333, 334, and 360 can comprise a communication network or multiple communication networks such as first wireless communication network 120 or second wireless communication network 121 found in FIG. 1, although variations are possible. In operation, elements 321, 322, 323, 331, 332, 333, 334, and 360 provide wireless access to communication services for at least user device 310.

CDMA RAN 321 includes radio access equipment of a CDMA communication system, and includes CDMA (e.g. non-LTE) signaling pathway 340 in this example comprising wireless link 320, links 350-351, and associated equipment. CDMA RAN 321 can include base stations, wireless access nodes, routers, switches, as well as RF communication circuitry including antennas, amplifiers, filters, RF modulators, transceivers, and signal processing circuitry.

E-UTRAN 331 includes radio access equipment of an LTE communication system, and includes LTE signaling pathway 341 in this example comprising wireless link 330, links 354-355, and associated equipment. E-UTRAN 331 can include base stations, wireless access nodes, routers, switches, as well as RF communication circuitry including antennas, amplifiers, filters, RF modulators, transceivers, and signal processing circuitry.

IWS 333 and IWS 334 each comprise systems and equipment for transferring at least overhead and control communications between LTE and non-LTE pathways, among other operations. IWS 333 and IWS 334 can each include communication or network interfaces, as well as computer systems, microprocessors, circuitry, or some other processing devices or software systems, and can be distributed among multiple processing devices. Examples of IWS 333 and IWS 334 can also include software such as an operating system, logs, databases, utilities, drivers, networking software, and other software stored on a computer-readable medium. IWS 333 and IWS 334 can also each include CSFB systems, Call Session Control Function (CSCF) equipment, session initiation protocol (SIP) proxy systems, SIP routing systems, SIP monitoring systems, cloud-based systems, database systems, or other systems.

An LTE S102 signaling pathway, such as link 352, is employed in some LTE systems for routing voice call signaling and to ensure delivery of paging information as well as other CSFB overhead signaling from a non-LTE communication network using a non-LTE communication protocol, such as for CDMA legacy systems. For example, call paging information indicating incoming calls from network 360 can be transferred over LTE CSFB signaling pathway 341 for receipt by one or more user devices.

The voice call itself can occur over various pathways. In typical examples, the voice call can occur over the non-LTE signaling pathway, namely CDMA pathway 340, which can include a 1×RTT communication mode or link for handling of voice calls. In another example, the voice call itself can occur over a data pathway of LTE network 362, such as a Voice over IP (VoIP) or Voice over packet (VoP) pathway. Thus, a user device communicating primarily over LTE signaling pathway 341 and receiving wireless access via LTE wireless link 330 can still receive incoming CDMA voice call alerts via the call paging information transported over the S102 interface. Once the call paging information indicates an incoming call, then an affected user device can initiate further signaling to establish the voice call over CDMA pathway 340 using CDMA wireless link 340.

Network 360 comprises voice and data communication and control systems for providing access to communication services for user devices and routing communications between network 360 and other voice and data networks. In some examples, network 360 includes equipment to provide wireless access to communication services within different coverage areas to user devices, route communications between content providers and user devices, and facilitate handoffs between equipment of different coverage areas, among other operations. Network 360 can also comprise further elements such as radio access network (RAN) equipment, E-UTRAN Node B equipment, eNodeB equipment, Evolved Node B equipment, Mobility Management Entity (MME) equipment, interworking services (IWS), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment. Network 360 can include LTE and CDMA networks and systems, among other types of cellular communication networks.

Figure 4:
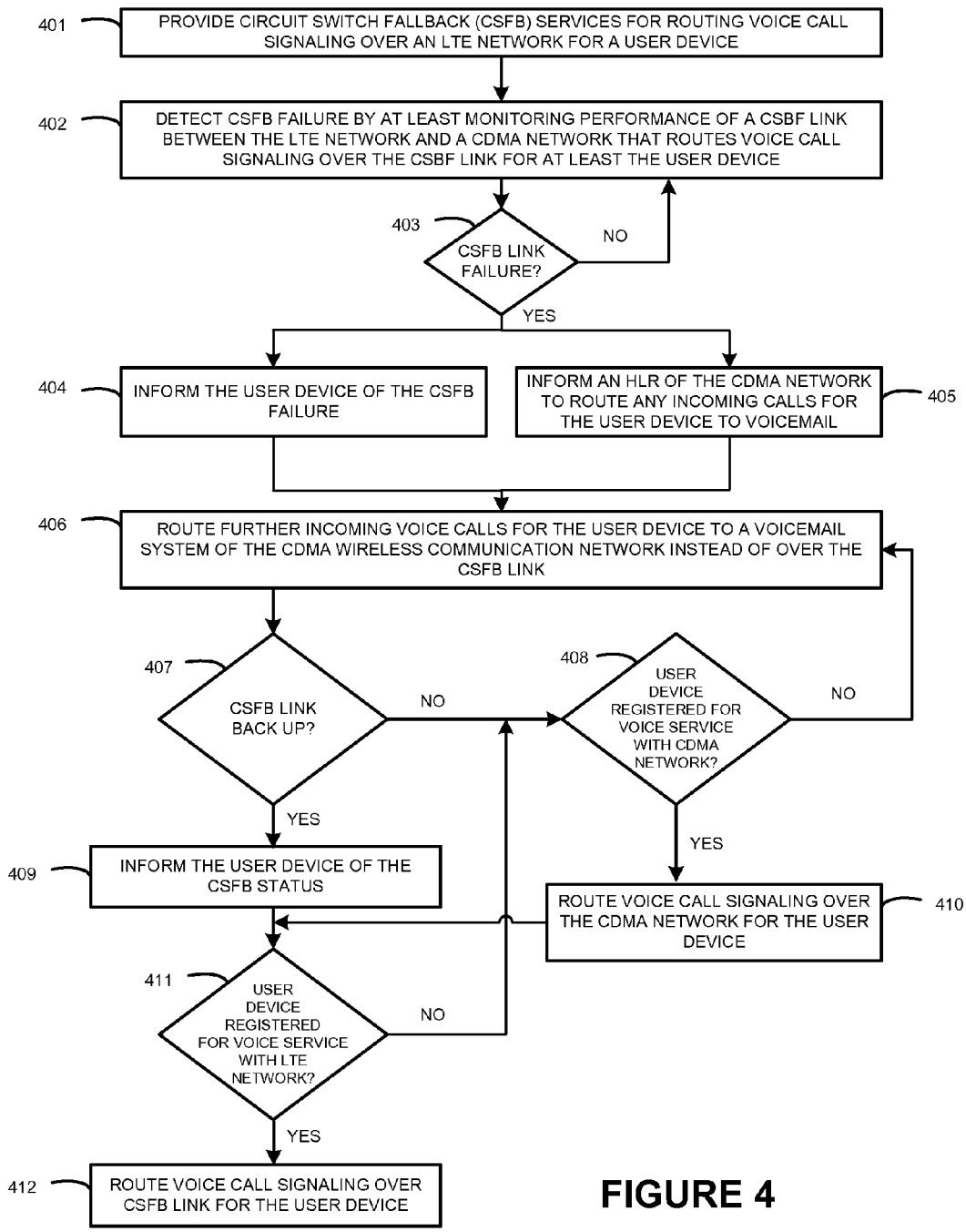
FIG. 4 is a flow diagram illustrating a method of operation of a communication system.

FIG. 4 illustrates a flow diagram which describes an example method of operation of a communication system, such as for communication system 300 of FIG. 3. The operations of FIG. 4 are referenced parenthetically in the description below. Communication system 300 provides (401) circuit switch fallback (CSFB) services for routing voice call signaling over an LTE network for user device 310. In some examples, the CSFB services comprise Enhanced CSFB (eCSFB).

To establish the CSFB services over LTE network 362, user device 310 wirelessly registers with LTE network 362 to receive a wireless data service with CSFB services enabled. In this example, LTE network 362 includes at least E-UTRAN 331, MME 332, IWS 334, and portions of network 360. The wireless data service is established over LTE wireless link 330, which is provided by E-UTRAN 331 after successful registration with at least MME 332. User device 310 indicates to MME 332 that CSFB services are enabled or allowed for user device 310, and responsively MME 332 sets CSFB as enabled. The LTE wireless data services can include data exchange, overhead and control communications, streaming media, and the like. In some examples, LTE network 362 provides an indication to user device 310 (such as LTE SIB1 indicating SIB8 presence/schedule) in a SIB8 message (CDMA2000 info) that CSFB/eCSFB is supported. User device 310 then initiates LTE registration and upon successful registration, will pre-register with CDMA network over the S102 link.

After the registration with LTE network 362 and responsive to a voice call page over the CSFB signaling, user device 310 wirelessly registers with CDMA network 361 to establish a voice call over a wireless circuit switched voice service of CDMA network 361. The voice call page can be issued by MSC 322 in response to an incoming voice call for user device 310 originated by user device 370. User device 310 can tune away temporarily from LTE wireless link 330 to a frequency band, spectrum, or channel associated with CDMA wireless link 320 in order to register for the wireless circuit switched voice service over CDMA network 361 and engage in the voice call.

CDMA network 361 can include at least CDMA RAN 321, MSC 322, links 350-351, and portions of network 360. In this example, the CSFB signaling includes control or overhead signaling, such as voice call indicators, voice call pages, channel assignments, resource assignments, or other control overhead information. MSC 322 can indicate the voice call page over control or overhead signaling over IWS 333 to IWS 334 or MME 332. MME 332 can include the voice call page indication in CSFB signaling in portions of the LTE signaling, such as indicated by LTE CSFB signaling pathway 341.

In some examples, an LTE S102 signaling pathway is employed. The LTE S102 signaling pathway can include portions of LTE CSFB signaling pathway 341 such as IWS 333, IWS 334, and link 352. E-UTRAN 331 transfers CDMA overhead signaling for establishing a voice call to user device 310 over LTE wireless link 330. The overhead signaling includes CSFB signaling of at least one of call paging signaling, circuit switched voice call signaling, and text message signaling. Other types of CDMA overhead signaling can be carried over the LTE S102 signaling pathway.

During operation of communication system 300, any of IWS 333 or IWS 334 detects (402) CSFB failure by at least monitoring performance of a CSFB link between LTE network 362 and CDMA network 361 that routes incoming voice calls over the CSFB link for at least the WCD. In this example, the CSFB link comprises portions of link 352, IWS 333, and IWS 334. The CSFB failure can be caused by failure of one or more of link 352, IWS 333, and IWS 334. Any of IWS 333 or IWS 334 can detect the CSFB failure by monitoring traffic handled by any of link 352, IWS 333, and IWS 334, and determining if the traffic is halted, delayed beyond a threshold delay, among other monitoring functions.

In some examples, any of IWS 333 or IWS 334 generates heartbeat traffic and transfers this heartbeat traffic over link 352 to detect the CSFB failure. The heartbeat traffic can include network ping traffic or other network messaging that prompts any of IWS 333 or IWS 334 to respond to the heartbeat traffic with a response message, such as an acknowledge packet. By monitoring the heartbeat traffic generated by any of IWS 333 or IWS 334, the CSFB link can be monitored for uptime or failure even when active communication sessions or overhead communication signaling is not presently transferred for use in CSFB services of user devices or WCDs. In some examples, when voice call signaling is occurring over the CSFB link, then any of IWS 333 or IWS 334 can use traffic associated with the voice call signaling as the heartbeat traffic. When voice call signaling is not occurring over the CSFB link, then any of IWS 333 or IWS 334 can generate separate heartbeat traffic to monitor the CSFB link.

If the CSFB link experiences a failure (403), then IWS 334 informs (404) the WCD of the CSFB failure. In this example, IWS 334 informs user device 310 of the CSFB link failure using one or more CSFB failure messages. These CSFB failure messages can be transferred by IWS 334 for delivery to user device 310 over U-UTRAN 331 and wireless link 330. Responsive to the CSFB failure message user device 310 can de-register from LTE network 362. The CSFB failure can indicate an inability to establish a voice call initiated by WCD 310 over LTE CSFB pathway 341, and user device 310 can responsively seek to receive communication services elsewhere.

IWS 333 can inform (405) an HLR of CDMA network 361 to route any incoming calls for user device 310 to a voicemail service associated with user device 310. In this example, IWS 333 can inform HLR 323 of the CSFB link failure and responsively transfer a CSFB failure message for delivery to HLR 323. HLR 323 can handle incoming voice calls for user device 310 by routing the voice calls to a treatment service. A treatment service can include a voicemail service for recording and handling of voicemails. This routing of incoming voice calls to a treatment service can include ignoring a timeout delay, such as a number of rings, before an incoming call is transferred to treatment service for user device 310. This can reduce delays for a calling party to reach a voicemail service associated with user device 310 when a CSFB link has failed making user device 310 unreachable for a period of time. IWS 333 can inform HLR 323 over MSC 322 and link 356, among other pathways.

Responsive to the CSFB failure, CDMA network 361 routes (406) further incoming voice calls for user device 310 to a voicemail system of CDMA network 361 instead of over the CSFB link. Prior to failure of the CSFB link, incoming call paging or overhead signaling for voice calls for user device 310, such as a voice call initiated by device 370 for user device 310, are routed over LTE CSFB pathway 341, and an associated voice call is established over CDMA pathway 340 (or alternatively as a packet-based voice call over LTE network 362). However, when the CSFB link fails, then an incoming voice call would not be established due to failure of portions of LTE CSFB pathway 341. Responsively, CDMA network 361 routes the incoming voice call to a voicemail service, such as that associated with HLR 323, instead of over a communication pathway to user device 310.

During the failure state of the CSFB link, IWS 333 and IWS 334 continue to monitor the CSFB link. If the CSFB link comes back up or becomes active again (407), then IWS 333 can optionally inform (409) user device 310 of the change in CSFB status. A CSFB link status message can be transferred for delivery to user device 310 by IWS 333 which indicates the CSFB link is active again after failure and that user device 310 can re-scan for LTE networks with CSFB support Responsive to the CSFB link status message indicating that the CSFB link is active again, user device 310 can register (411) for voice service with LTE network 362. If user device 310 has registered for service with LTE network 362, then CDMA network 361 routes (412) incoming voice call signaling over the CSFB link for user device 310. Paging communications or other overhead communications for the voice call can be routed using LTE CSFB pathway 341. The actual voice call can be routed over CDMA pathway 340 to user device 310. In other examples, the actual voice call can instead be routed over elements of LTE network 362 using voice over packet communications. The voice over packet communications can include employing a user application on user device 310, such as Skype, Fring, or another user application. The voice over packet communications can also include a voice over Internet protocol (VoIP) or voice over LTE (VoLTE) application or software service of user device 310.

The registration process that user device 310 performs with LTE network 362 can include a registration process over LTE wireless link 330 or a registration process to establish LTE wireless link 330. Beacon or pilot signals of at least E-UTRAN 331 can be monitored by user device 310 to establish the wireless data service over LTE wireless link 330 or to establish LTE wireless link 330. The wireless data service can include a cellular data service, such as provided over LTE wireless link 330, and can include various registration and handshaking to establish LTE wireless link 330. The CSFB configuration is indicated as enabled by user device 310 during this registration process, which can then be communicated to elements of LTE network 362 or elements of CDMA network 361 and responsively set for user device 310.

Responsive to the CSFB link failure, user device 310 can register (408) for voice service with CDMA network 361, and then CDMA network 361 routes (410) incoming voice calls for user device 310 over CDMA network 361. User device 310 need not de-register from LTE network 362 before registering for voice service with CDMA network 361, and instead can suspend some elements or resources of the LTE service. This de-registration can include tear down signaling or de-registration signaling over LTE wireless link 330. This de-registration can also include indicating de-registration signaling to E-UTRAN 331 or MME 332 of LTE network 362. De-registration can include further tuning away from LTE wireless link 330 or disabling a transceiver portion of user device 310 associated with LTE wireless link 330.

When user device 310 registers for voice service with CDMA network 361 responsive to the CSFB link failure, then CDMA network 361 can indicate to HLR 323 that incoming voice calls are not to be immediately routed to a treatment service and instead use normal paging procedures to attempt to reach user device 310 and establish a voice call. In some examples, a voicemail delay, such as a predetermined number of rings, is employed during normal paging procedures before routing the voice call to a treatment services, such as a voicemail service. Additionally, CDMA network 361 can route incoming voice calls and incoming voice call signaling over CDMA network 361 to user device 310 instead of immediately to a voicemail service of user device 310.

The examples above for FIGS. 3 and 4 discuss CDMA networks and CSFB signaling providing control or overhead signaling for CDMA networks over LTE signaling. It should be understood that GSM, UMTS, or other legacy communication signaling can instead be provided over the CSFB signaling discussed herein. Furthermore, although CSFB link services for only one user device are discussed, it should be understood that any number of user devices and CSFB links can be employed.

Figure 5:
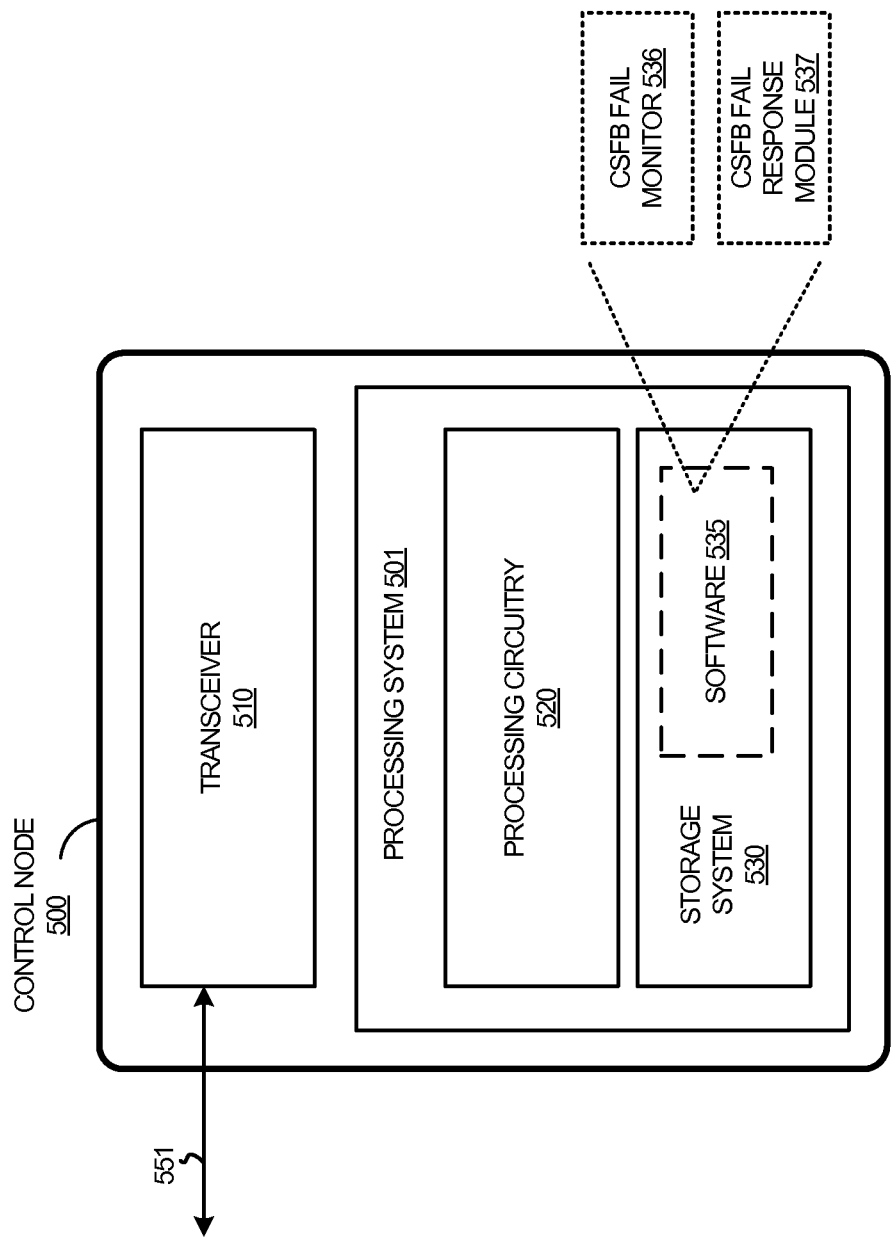
FIG. 5 is a block diagram illustrating a control node.

FIG. 5 is a block diagram illustrating a detailed view of control node 500. Control node 500 can include equipment and systems as discussed herein for control node 125 and control node 126 in FIG. 1, or IWS 333 and IWS 334 of FIG. 3, although variations are possible. Control node 500 includes transceiver 510 and processing system 501. Processing system 501 further includes processing circuitry 520, and storage system 530. Processing circuitry 520 is operatively linked to transceiver 510 and storage system 530 by one or more communication interfaces, which can comprise busses, discrete connections, network links, software interfaces, or other circuitry. It should be understood that discrete links can be employed, such as network links or other circuitry. Control node 500 can be distributed or consolidated among equipment or circuitry that together forms the elements of control node 500. Control node 500 can optionally include additional devices, features, or functionality not discussed here for purposes of brevity.

Transceiver 510 includes one or more communication interfaces for communicating with communication networks, such as first wireless communication network 120 or second wireless communication network 121 of FIG. 1 or various elements of FIG. 3. The network interface can include a T1 interface, or local or wide area network communication interfaces which can communicate over an Ethernet or Internet protocol (IP) link. Examples of transceiver 510 include network interface card equipment, transceivers, modems, and other communication circuitry. In this example, transceiver 510 communicates over link 551. Link 551 can include any communication link as described herein, such as that described for links 132-134 in FIG. 1 or links 353-356 in FIG. 3.

Processing system 520 can comprise one or more microprocessors and other circuitry that retrieves and executes software 535 from storage system 530. Processing system 520 can be implemented within a single processing device but can also be distributed across multiple processing devices or sub-systems that cooperate in executing program instructions. Examples of processing system 520 include general purpose central processing units, application specific processors, and logic devices, as well as any other type of processing device, combinations, or variations thereof.

Storage system 530 can comprise any non-transitory computer readable storage media readable by processing system 520 and capable of storing software 535. Storage system 530 can include volatile and nonvolatile, removable and non-removable media implemented in any method or technology for storage of information, such as computer readable instructions, data structures, program modules, or other data. In addition to storage media, in some implementations storage system 530 can also include communication media over which software 535 can be communicated. Storage system 530 can be implemented as a single storage device but can also be implemented across multiple storage devices or sub-systems co-located or distributed relative to each other. Storage system 530 can comprise additional elements, such as a controller, capable of communicating with processing system 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Software 535 can be implemented in program instructions and among other functions can, when executed by control node 500 in general or processing system 520 in particular, direct control node 500 or processing system 520 to track and register wireless communication devices, provide communication services to wireless communication devices, authenticate wireless communication devices, monitor circuit switched fallback (CSFB) services and CSFB links, respond to CSFB failures, inform WCDs of CSFB failures, inform HLRs of CSFB failures, among other operations. Software 535 can include additional processes, programs, or components, such as operating system software, database software, or application software. Software 535 can also comprise firmware or some other form of machine-readable processing instructions executable by processing system 520.

In at least one implementation, the program instructions can include first program instructions that include CSFB failure monitor module 536 and CSFB failure response module 537. Module 536 can direct processing system 520 to monitor status of one or more CSFB links, such as monitoring user or overhead traffic of the one or more CSFB links, or generating heartbeat traffic and monitoring the heartbeat traffic to monitor the one or more CSFB links. Module 537 can respond to failures of CSFB links detected by module 536. Module 537 can inform one or more WCDs associated with a failed CSFB link that the CSFB link has failed. Module 537 can inform HLRs associated with WCDs that experienced a CSFB failure to handle incoming calls differently due to the failure of the CSFB link.

In general, software 535 can, when loaded into processing system 520 and executed, transform processing system 520 overall from a general-purpose computing system into a special-purpose computing system customized to track and register wireless communication devices, provide communication services to wireless communication devices, authenticate wireless communication devices, monitor circuit switched fallback (CSFB) services and CSFB links, respond to CSFB failures, inform WCDs of CSFB failures, inform HLRs of CSFB failures, among other operations. Encoding software 535 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 535 can transform the physical state of the semiconductor memory when the program is encoded therein. For example, software 535 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Control node 500 can also include other elements, such as user interfaces, computer systems, databases, distributed storage and processing elements, and the like. Control node 500 can be included in the equipment or systems of first wireless communication network 120 or second wireless communication network 121 of FIG. 1, or elements 321, 322, 323, 331, 332, 333, 334, or 350 of FIG. 3, or can be included in separate equipment or systems, including combinations thereof.

Referring back to FIG. 1, wireless communication device 110 comprises one or more antennas, transceiver circuitry elements, and communication elements. The transceiver circuitry typically includes amplifiers, filters, modulators, and signal processing circuitry. Wireless communication device 110 can also include user interface systems, memory devices, non-transitory computer-readable storage mediums, software, processing circuitry, or some other communication components. Wireless communication device 110 can be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

First wireless communication network 120 and second wireless communication network 121 each comprises communication and control systems for providing access to communication services for user devices. First wireless communication network 120 and second wireless communication network 121 can each provide communication services including voice calls, text messages, data access, or other communication services provided over cellular or wireless communication networks. In some examples, First wireless communication network 120 includes equipment to provide wireless access to communication services within different coverage areas to user devices, route communications between content providers and user devices, and facilitate handoffs between equipment of different coverage areas, among other operations. First wireless communication network 120 and second wireless communication network 121 can also each comprise elements such as radio access network (RAN) equipment, E-UTRAN Node B equipment, eNodeB equipment, Evolved Node B equipment, Mobility Management Entity (MME) equipment, interworking functions (IWS), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Control node 125 comprises systems and equipment to track and register wireless communication devices, provide CSFB services to wireless communication devices, authenticating wireless communication devices, monitor circuit switched fallback (CSFB) links, and receive CSFB enable/disable indicators transferred by wireless communication devices, among other operations. Control node 125 can include communication or network interfaces, as well as computer systems, microprocessors, circuitry, or some other processing devices or software systems, and can be distributed among multiple processing devices. Examples of control node 125 can also include software such as an operating system, logs, databases, utilities, drivers, networking software, and other software stored on a computer-readable medium. Control node 125 typically includes Mobility Management Entity (MME) equipment. In further examples, control node 125 can include the functionality of, or combined functionality with, gateways, home subscriber server (HSS) equipment, Call Session Control Function (CSCF) equipment, session initiation protocol (SIP) proxy systems, SIP routing systems, SIP monitoring systems, mobile switching centers (MSC), radio access network (RAN) equipment, E-UTRAN equipment, interworking functions (IWS), cloud-based systems, database systems, or other systems.

Communication links 132-134 each use metal, glass, optical, air, space, or some other material as the transport media. Communication links 132-134 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 132-134 can each be a direct link or can include intermediate networks, systems, or devices, and can include a logical network link transported over multiple physical links.

Wireless links 130-131 can each use the air or space as the transport media. Wireless links 130-131 each comprises one or more wireless communication links provided over an associated wireless frequency spectrum or wireless frequency band, and can use various protocols. In this example, wireless link 130 can comprise a Long Term Evolution (LTE) or LTE Advanced wireless link, including combinations, improvements, or variations thereof. Also in this example, wireless link 131 can comprise a non-LTE wireless link such as Code Division Multiple Access (CDMA), Evolution-Data Optimized (EVDO), single-carrier radio transmission technology link (1×RTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for each of wireless links 130-131 is shown in FIG. 1, it should be understood that wireless links 130-131 are merely illustrative to show communication modes or wireless access pathways for wireless communication device 110. In other examples, further wireless links can be shown, with portions of the further wireless links shared and used for different communication sessions or different content types, among other configurations.

Communication links 130-134 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a control node of a wireless communication system, where a wireless communication device is initially configured to use circuit switch fallback (CSFB) services over a first wireless communication network, the method comprising:

detecting CSFB failure by at least monitoring performance of a CSBF link between the first wireless communication network and a second wireless communication network that routes voice call signaling over the CSBF link for the wireless communication device;

responsive to the CSFB failure, informing at least the wireless communication device of the CSFB failure, informing a home location register (HLR) in the second wireless communication network of the CSFB failure, and informing the HLR to process incoming voice calls with a treatment service having a voicemail timeout delay; and responsive to the CSFB failure, routing further incoming voice call signaling for the wireless communication device using the second wireless communication network instead of the CSFB link.

2. The method of claim 1, further comprising:

during the CSFB failure, detecting when the wireless communication device has registered for voice service over the second wireless communication network, and responsively routing the incoming voice calls to the wireless communication device over the second wireless communication network.

3. The method of claim 1 wherein informing the HLR to process the incoming voice calls with the treatment service having the voicemail timeout delay comprises informing the HLR to process the incoming voice call with the treatment service for the wireless communication device without waiting for the voicemail timeout delay.

4. The method of claim 1 wherein informing the HLR to process the incoming voice calls with the treatment service having the voicemail timeout delay comprises informing the HLR to process the incoming voice call with the treatment service for the wireless communication device with waiting for the voicemail timeout delay.

5. The method of claim 1, wherein detecting the CSFB failure by at least monitoring the performance of the CSBF link comprises monitoring a heartbeat signal transferred over the CSFB link.

6. The method of claim 5, wherein the heartbeat signal comprises the voice call signaling transferred over the CSFB link.

7. The method of claim 5, wherein the heartbeat signal comprises heartbeat communications periodically transferred over the CSFB link between ones of the first wireless communication network and the second wireless communication network.

8. The method of claim 5, wherein first wireless communication network comprises a Long Term Evolution (LTE) wireless network, wherein the second wireless communication network comprises one of a Code Division Multiple Access (CDMA) communication network and a Universal Mobile Telecommunications System (UMTS) communication network, and wherein the CSFB link comprises an S102 interface between the LTE wireless network and the second wireless communication network.

9. The method of claim 1, further comprising:
responsive to the CSFB failure, broadcasting a CSFB failure message to all wireless communication devices that receive the CSFB services over the CSFB link.

10. A wireless communication system, where a wireless communication device is initially configured to use circuit switch fallback (CSFB) services over a first wireless communication network, the wireless communication system comprising:
a control node configured to detect CSFB failure by at least monitoring performance of a CSBF link between the first wireless communication network and a second wireless communication network that routes voice call signaling over the CSBF link for at least the wireless communication device;
responsive to the CSFB failure, the control node configured to inform at least the wireless communication device of the CSFB failure, inform a home location register (HLR) in the second wireless communication network of the CSFB failure, and inform the HLR to process incoming voice calls with a treatment service having a voicemail timeout delay; and
responsive to the CSFB failure, the wireless communication network configured to route further voice call signaling for the wireless communication device using the second wireless communication network instead of the CSFB link.

11. The wireless communication system of claim 10, comprising:
the control node configured to detect when the wireless communication device has registered for voice service over the second wireless communication network, and responsively instruct the second wireless communication network to route the incoming voice calls to the wireless communication device over the second wireless communication network.

12. The wireless communication system of claim 10 wherein the control node configured to inform the HLR to process the incoming voice calls with the treatment service having the voicemail timeout delay comprises the control node configured to inform the HLR to process the incoming voice call with the treatment service for the wireless communication device without waiting for the voicemail timeout delay.

13. The wireless communication system of claim 10 wherein the control node configured to inform the HLR to process the incoming voice calls with the treatment service having the voicemail timeout delay comprises the control node configured to inform the HLR to process the incoming voice call with the treatment service for the wireless communication device with waiting for the voicemail timeout delay.

14. The wireless communication system of claim 10, comprising:
the control node configured to monitor a heartbeat signal transferred over the CSFB link to detect the CSFB failure by at least monitoring the performance of the CSBF link.

15. The wireless communication system of claim 14, wherein the heartbeat signal comprises the voice call signaling over the CSFB link.

16. The method of claim 14, wherein the heartbeat signal comprises heartbeat communications periodically transferred over the CSFB link between ones of the first wireless communication network and the second wireless communication network.

17. The wireless communication system of claim 10, wherein first wireless communication network comprises a Long Term Evolution (LTE) wireless network, wherein the second wireless communication network comprises one of a Code Division Multiple Access (CDMA) communication network and a Universal Mobile Telecommunications System (UMTS) communication network, and wherein the CSFB link comprises an S102 interface between the LTE wireless network and the second wireless communication network.

18. The wireless communication system of claim 10, comprising:
responsive to the CSFB failure, the control node configured to broadcast a CSFB failure message to all wireless communication devices that receive the CSFB services over the CSFB link.

* * * * *